US012780432B2

(12) United States Patent
Andronache et al.

(10) Patent No.: US 12,780,432 B2
(45) Date of Patent: Nov. 3, 2026

(54) AIRCRAFT ENGINE ASSEMBLY STAND AND METHOD OF USING THE SAME

(71) Applicant: PRATT & WHITNEY CANADA CORP., Longueuil (CA)

(72) Inventors: Valentin Andronache, Longueuil (CA); Danny Noiseux, Longueuil (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/779,525

(22) Filed: Jul. 22, 2024

(65) Prior Publication Data

US 2026/0021896 A1 Jan. 22, 2026

(51) Int. Cl.
*B64D 27/40* (2024.01)
*B64F 5/10* (2017.01)

(52) U.S. Cl.
CPC ................ *B64D 27/40* (2024.01); *B64F 5/10* (2017.01)

(58) Field of Classification Search
CPC ................................. B64F 5/50; F01D 25/285
See application file for complete search history.

(56) References Cited

U.S. PATENT DOCUMENTS 5,816,367 A * 10/1998 Lilja ........................ B64F 5/50 187/244
5,870,824 A * 2/1999 Lilja ........................ F02C 7/00 187/244
6,279,309 B1 * 8/2001 Lawlor ................ F01D 25/285 60/39.35
6,546,616 B2 4/2003 Radowick
6,671,941 B2 1/2004 Scott et al.
7,047,614 B2 5/2006 Scott et al.
8,833,776 B2 * 9/2014 Boulanger ................ B66F 9/06 280/47.131
9,309,008 B2 * 4/2016 Boulanger ............ B66F 7/0625
9,321,167 B2 * 4/2016 Scelsi .................. B25H 1/0007
9,518,533 B2 * 12/2016 Holay ................... F01D 25/285
9,885,286 B2 * 2/2018 Murphy .................... F02C 7/20
9,926,808 B2 * 3/2018 Hallam .................. F16M 11/42
(Continued)

FOREIGN PATENT DOCUMENTS

CN 117340844 1/2024
WO WO-2017020883 A1 * 2/2017 .......... F01D 25/285

OTHER PUBLICATIONS

WO-2017020883-A1 translation (Year: 2017).*
European Search report issued on Jan. 16, 2026 for corresponding application No. 25191118.6.

*Primary Examiner* — Michael W Hotchkiss
(74) *Attorney, Agent, or Firm* — NORTON ROSE FULBRIGHT CANADA LLP

(57) ABSTRACT

A method of assembling an aircraft engine having a case assembly is disclosed, and includes mounting a first section of the case assembly to a cradle at a first location on the first section, mounting a support arm to both of the cradle and the first section at a second location on the first section. The second location is axially offset from the first location relative to a central axis of the aircraft engine. The method also includes, while the first section is supported by the support arm: assembling a second section of the case assembly to the first section, and mounting an engine support to the second section. The support arm is then disconnected from the case assembly.

7 Claims, 8 Drawing Sheets

(56) References Cited

U.S. PATENT DOCUMENTS

| | | | | |
|---|---|---|---|---|
| 9,982,568 | B2 * | 5/2018 | Reinhardt | F01D 25/285 |
| 10,221,724 | B2 | 3/2019 | Murphy et al. | |
| 10,533,498 | B2 * | 1/2020 | Murphy | F02C 7/20 |
| 11,052,533 | B2 * | 7/2021 | Baucher | B62D 65/18 |
| 11,248,497 | B2 * | 2/2022 | Porco | B25H 1/0007 |
| 11,305,892 | B2 * | 4/2022 | Chantal | B66F 5/025 |
| 11,548,660 | B2 | 1/2023 | Henriksen et al. | |
| 11,725,542 | B2 | 8/2023 | Porco et al. | |
| 11,732,614 | B2 | 8/2023 | Massicotte et al. | |
| 2014/0208584 | A1 * | 7/2014 | Foerster | B23P 19/04 29/700 |
| 2015/0204213 | A1 * | 7/2015 | Richter | F02C 7/20 29/889.1 |
| 2015/0316197 | A1 * | 11/2015 | Morey | B62B 3/001 248/556 |
| 2018/0142576 | A1 * | 5/2018 | Dervaux | F01D 25/285 |
| 2018/0283215 | A1 * | 10/2018 | Dubois | B66C 1/107 |
| 2018/0311808 | A1 * | 11/2018 | Baucher | B25H 1/0007 |
| 2019/0153900 | A1 * | 5/2019 | Murphy | B64F 5/50 |
| 2020/0230754 | A1 * | 7/2020 | Gastal | F02C 3/04 |
| 2023/0322411 | A1 * | 10/2023 | Dumont | B62B 5/0026 73/116.03 |

* cited by examiner

AIRCRAFT ENGINE ASSEMBLY STAND AND METHOD OF USING THE SAME

TECHNICAL FIELD

The present disclosure relates generally to aircraft engines and, more particularly, to systems and methods for supporting aircraft engines during assembly, disassembly, and maintenance operations.

BACKGROUND

Aircraft engines are built by assembling a plurality of components together, such as compressors, combustors, and turbines. Many of these components are enclosed within casing sections, which are secured to one another as the engines are assembled. Existing techniques to assemble the different components of such aircraft engines are satisfactory for their intended purposes, however improvements are always sought.

SUMMARY

There is provided, in accordance with a first aspect, a method of assembling an aircraft engine having a case assembly, the case assembly of the aircraft engine including a first section and a second section securable to one another, each of the first section and the second section including one or more cases of the case assembly, the method comprising: mounting the first section to a cradle at a first location on the first section; mounting a support arm to both of the cradle and the first section at a second location on the first section, the second location being axially offset from the first location relative to a central axis of the aircraft engine; while the first section is supported by the support arm: assembling a second section of the case assembly to the first section, and mounting an engine support to the second section; and disconnecting the support arm from the case assembly.

The method as defined above and described herein may further include one or more of the following features, in whole in part, and in any combination.

In certain aspects, the support arm includes a longitudinal section secured to the cradle and an arcuate section mounted to the longitudinal section, the mounting of the support arm including mounting the arcuate section to the first section at least at two locations circumferentially spaced apart from one another.

In certain aspects, mounting of the arcuate section includes mounting the arcuate section to an annular flange located at an intersection between two cases of the first section.

In certain aspects, the method includes orienting the first section with the central axis being substantially perpendicular to a ground before the mounting of the support arm.

In certain aspects, the method includes rotating the first section to orient the first section with the central axis being substantially parallel to the ground before the assembling of the second section to the first section.

In certain aspects, mounting of the engine support to the second section includes mounting the engine support to an axial extremity of the second section.

In certain aspects, mounting of the engine support to the axial extremity of the second section includes abutting a flange of the engine support to an axial end face of the second section.

In certain aspects, the second section includes an inlet case of the aircraft engine, the mounting of the engine support to the second section includes mounting the engine support to the inlet case.

In certain aspects, mounting of the first section to the cradle includes mounting the first section to the cradle via one or more bracket, the one or more bracket secured to both of the cradle and the first section.

There is also provided, in accordance with another aspect, a method of temporarily supporting a first section of a case assembly of an aircraft engine during assembly, disassembly, or maintenance, the method comprising: mounting the first section to a cradle at a first location using one or more bracket and at a second location axially offset from the first location relative to a central axis of the aircraft engine using a support arm while the first section is oriented substantially vertically relative to a ground; orienting the first section substantially horizontally relative to the ground; assembling a second section of the case assembly to the first section and mounting the second section to the cradle thereby decreasing a load transmitted to the cradle via the support arm; and disconnecting the support arm from the first section.

The method as defined above and described herein may further include one or more of the following features, in whole in part, and in any combination.

In certain aspects, the support arm includes a longitudinal section and an arcuate section mounted to the longitudinal section, the mounting of the first section to the cradle includes mounting the arcuate section to the first section at least at two locations circumferentially spaced apart from one another.

In certain aspects, mounting of the second section to the cradle includes mounting an engine support to the cradle and to an axial extremity of the second section.

In certain aspects, mounting of the engine support to the axial extremity of the second section includes abutting a flange of the engine support to an axial end face of the second section.

There is further provided, in accordance another aspect, an assembly for use during assembly, disassembly, or maintenance of an aircraft engine, the assembly comprising: one or more cases of the aircraft engine; and a stand, the stand having: a support; a cradle rotatably mounted to the support, the one or more cases being mounted to the cradle at a first location on the one or more cases; and a support arm secured to the cradle, the support arm secured to the one or more cases at a second location on the one or more cases, the second location axially offset form the first location relative to a central axis of the aircraft engine.

The method as defined above and described herein may further include one or more of the following features, in whole in part, and in any combination.

In certain aspects, the cradle includes a longitudinal member and a mounting flange being transverse to the longitudinal member, the cradle secured to the support via the mounting flange, the longitudinal member extending substantially parallel to the central axis.

In certain aspects, the support arm is secured to the longitudinal member.

In certain aspects, the support arm includes a longitudinal section secured to the longitudinal member, and an arcuate section secured to an end of the longitudinal section, the one or more cases secured to the arcuate section.

In certain aspects, the arcuate section is secured to an annular flange of the one or more cases, the annular flange located at an intersection between two cases of the one or more cases.

In certain aspects, there is provided one or more bracket, the one or more cases mounted to the cradle at the first location via the one or more bracket.

In certain aspects, the one or more cases are mounted to the cradle at the second location solely via the support arm.

BRIEF DESCRIPTION OF THE DRAWINGS

Reference is now made to the accompanying figures in which.

DETAILED DESCRIPTION

Figure 1:
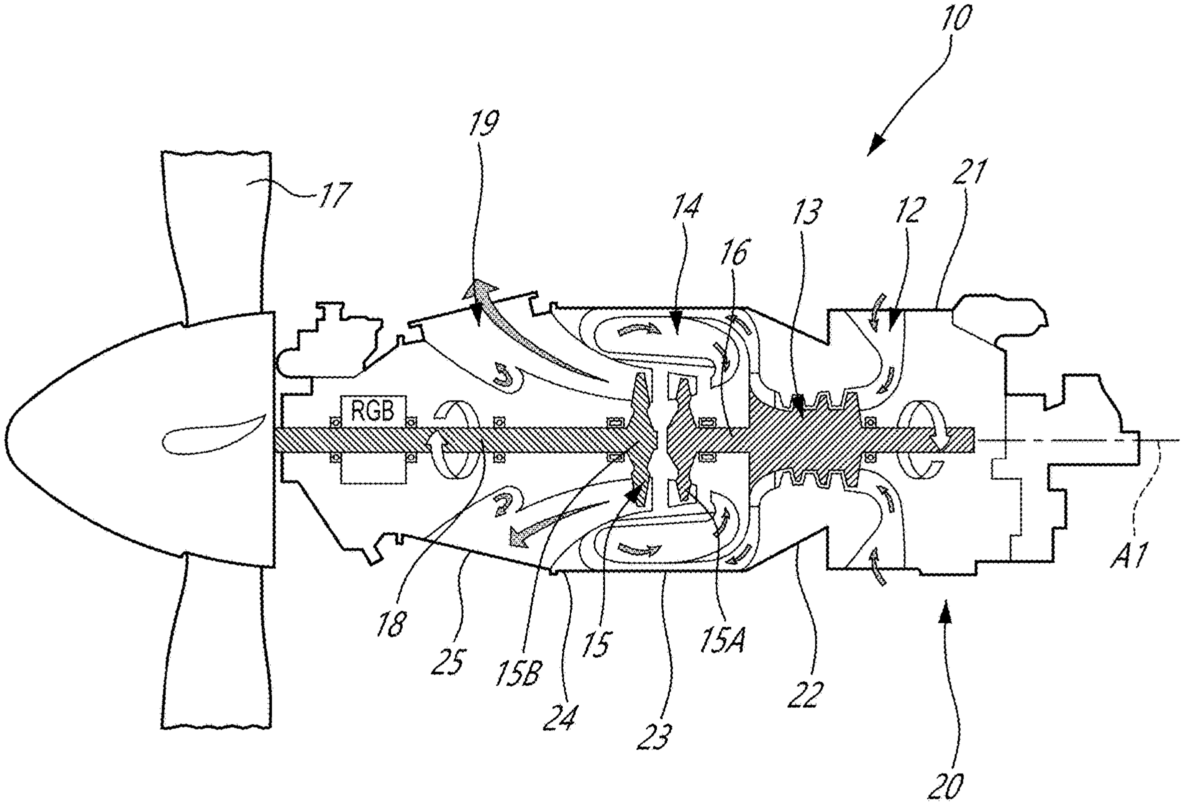
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication an inlet 12 for receiving air, a compressor section 13 for compressing the air received via the inlet 12, a combustor 14 for mixing fuel with the compressed air and for generating an annular stream of combustion gases, a turbine section 15 receiving the combustion gases from the combustor 14. The turbine section 15 has a high-pressure turbine 15A drivingly engaged to the compressor section 13 via a high-pressure shaft 16. The turbine section 15 further has a power or low-pressure turbine 15B downstream of the high-pressure turbine 15A and drivingly engaged to a propeller 17 via a low-pressure shaft 18. The low-pressure shaft 18 may be directly engaged to the propeller 17 or, as shown herein, drivingly engaged to the propeller 17 via a reduction gearbox RGB. The gas turbine engine 10 has an exhaust 19 for expelling the combustion gases. Although the depicted gas turbine engine 10 is a turboprop engine, the present disclosure may apply to other engines, such as turboshaft engines and to auxiliary power units (APU). In an alternate embodiment, the compressor section may include a high-pressure compressor drivingly engaged to the high-pressure turbine 15A via the high-pressure shaft 16 and a low-pressure compressor drivingly engaged to the low-pressure turbine 15B via the low-pressure shaft 18.

The gas turbine engine 10 includes a case assembly 20, which includes a plurality of cases disposed longitudinally along a central axis A1 of the gas turbine engine 10 and fastened to one another via, for instance, mating flanges. The case assembly 20 may include, for instance, an inlet case 21, an inter compressor case 22, a gas generator case 23, a turbine support case 24, and an exhaust case 25.

Figure 2:
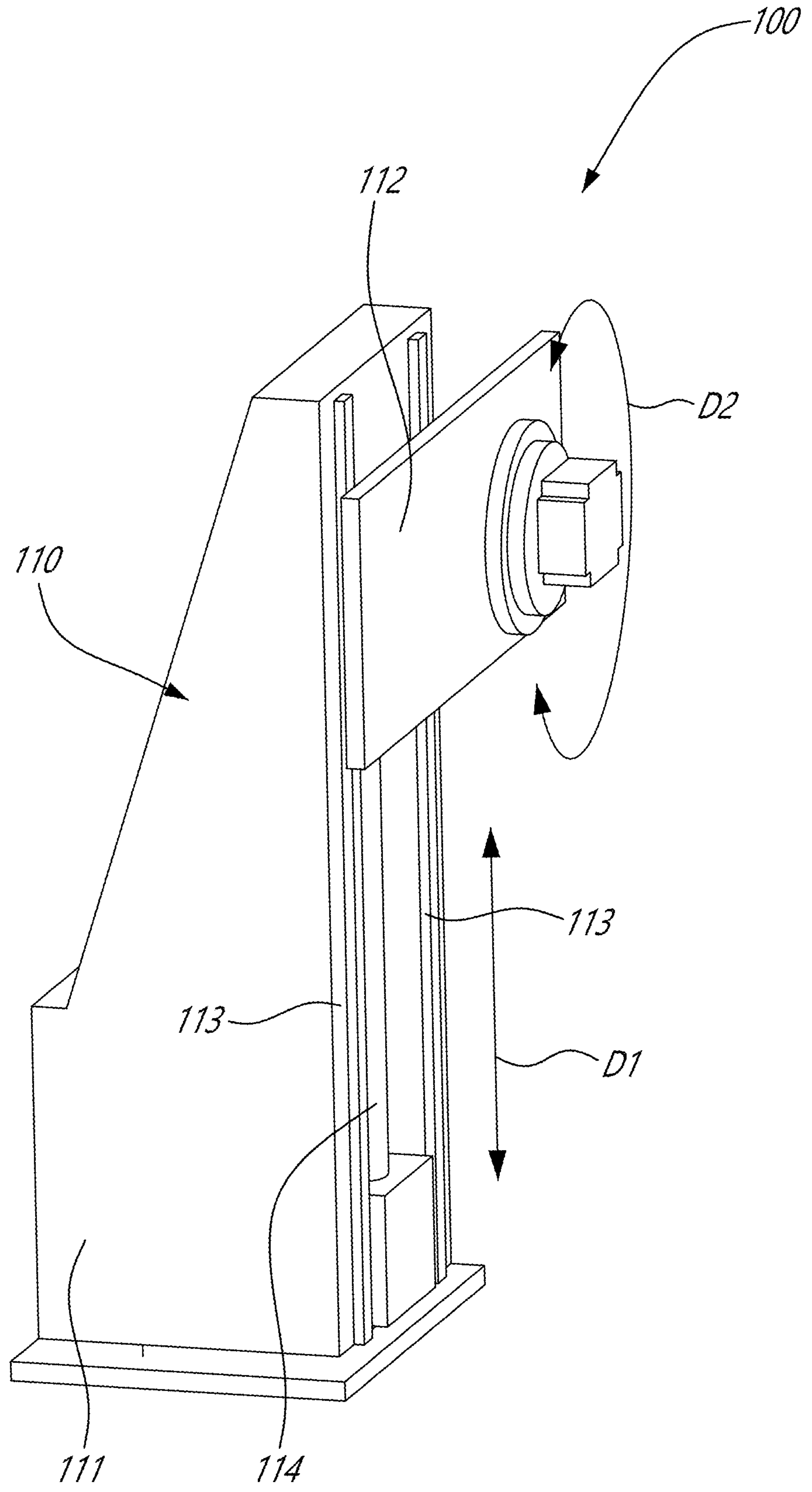
FIG. 2 is a three dimensional view of a support for an assembly stand for supporting the gas turbine engine of FIG. 1.
Figure 3:
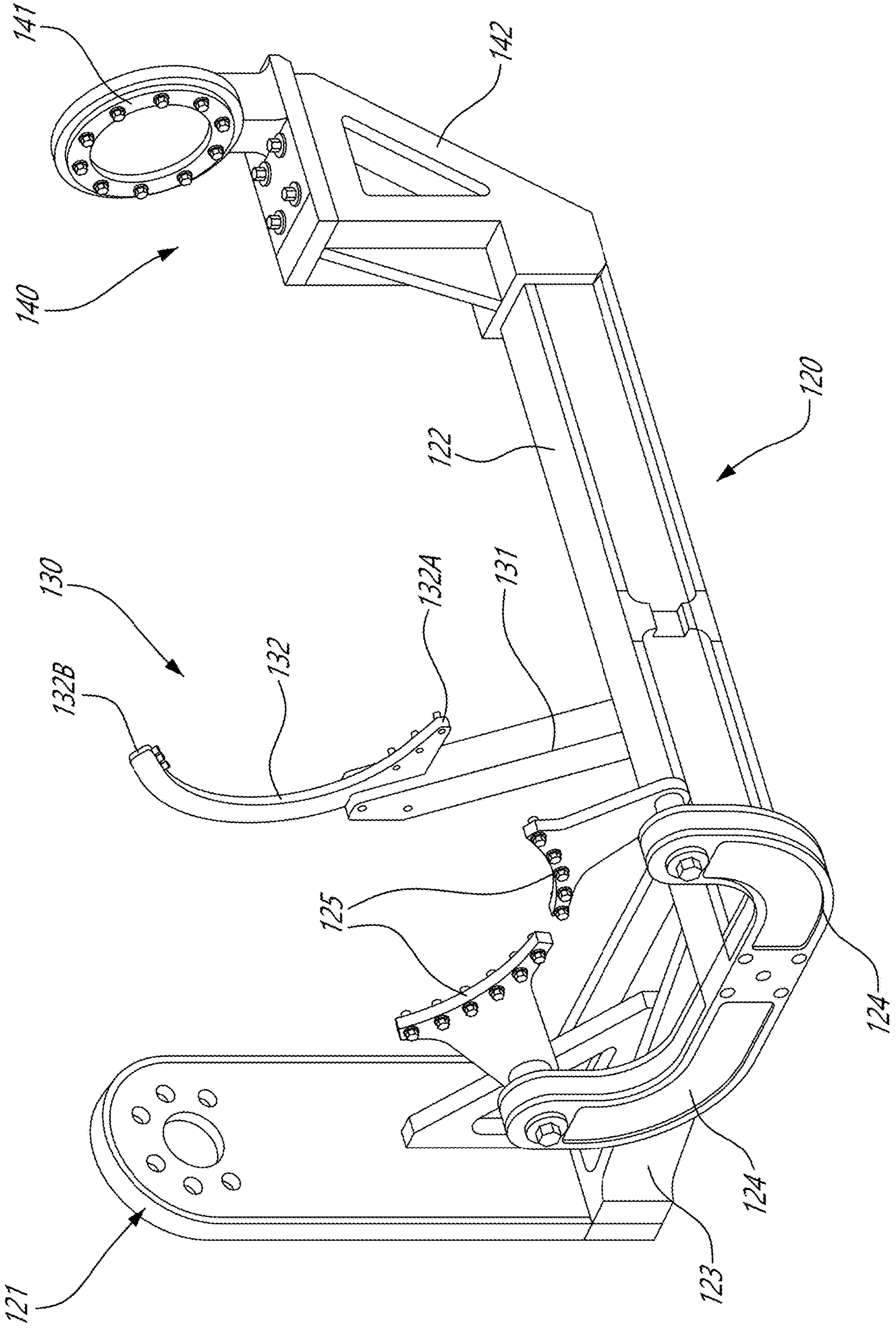
FIG. 3 is a three dimensional view of a cradle to be secured to the support of FIG. 2 and configured for supporting the gas turbine engine of FIG. 1.

FIGS. 2-3 show two parts of an assembly stand, referred to below as a stand, at 100. The stand 100 is configured for holding the gas turbine engine 10 during assembly/disassembly and/or maintenance operations. As will be seen hereinafter, the stand 100 is configured to rotate the gas turbine engine 10 along a plurality of axes to provide easy access to the different parts of the gas turbine engine 10. The stand 100 generally includes a support 110, which is depicted in FIG. 2, configured for supporting a cradle 120, which is depicted in FIG. 3, which will be described below. The support 110 includes a base 111 that may be supported on a ground surface. Alternatively, the base 111 may be secured to a wall or to any suitable static structure. The base 111 further includes a bracket 112. As will be seen herein after, the cradle 120 is releasably secured to the bracket 112 via a suitable connector, such as a quick connector. The bracket 112 is movable relative to the base 111 along a vertical direction D1 to vary an elevation of the gas turbine engine 10 relative to the ground. In the disclosed embodiment, the bracket 112 is engaged to the base 111 via rails 113. The support 110 may include an actuator 114, such as a hydraulic actuator, engaged to both of the base 111 and the bracket 112 and operable to move the bracket 112 along the vertical direction D1. Any other means for moving the bracket 112 relative to the base 111 are contemplated. For instance, the support 110 may include a motor drivingly engaged to sprocket meshed with a chain secured to the bracket 112. Rotation of the sprocket exerts a tension force on the chain thereby moving the bracket 112. A rack and pinion gear mechanism may alternatively be used. A pivotal engagement is provided between the cradle 120 and the bracket 112 to allow a rotation D2 of the cradle 120, and of the gas turbine engine 10 secured thereto, about an axis, which may be substantially perpendicular to the direction D1. In the context of the present disclosure, the expression “substantially”, as in “substantially perpendicular” implies that some deviations from perfect perpendicularity caused, for instance, by manufacturing tolerances, is permissible.

Referring now to FIG. 3, the cradle 120 is described in greater detail. The cradle 120 is rotatably mounted to the bracket 112 of the support 110 such as to permit rotation of the cradle 120 about the direction D2. The cradle 120 includes a mounting flange 121 for securing the cradle 120 to the bracket 112 of the support 110. The cradle 120 further includes a longitudinal member 122 secured to the mounting flange 121 via a transverse member 123. The transverse member 123 extends transversally to the mounting flange 121. The longitudinal member 122 extends transversally to the transverse member 123. The mounting flange 121 may define apertures for receiving fasteners used to secure the mounting flange 121 to the support 110. Any means for securing the mounting flange 121 to the support 110 are contemplated.

The cradle 120 further includes two lateral members 124 each secured to the longitudinal member 122 and extending away from the longitudinal member 122 and away from one another. The two lateral members 124 may each define an arcuate shape configured for reaching sides of the aircraft engine. Two brackets 125 may each be secured to a respective one of the two lateral members 124. These brackets 125 are used as an interface between the case assembly 20 of the gas turbine engine 10 and the cradle 120. In other words, the case assembly 20 may be secured to the two lateral members 124 via the two brackets 125. In some embodiments, only one of the two brackets 125 and one of the two lateral members 124 may be present. The brackets 125 may be designed for a specific type of engines (e.g., a specific model of turboprop) and another set of brackets may be used when the cradle 120 is used for another type of engine (e.g., a turbofan, or another model of turboprop).

A support arm 130 and an engine support 140 may be used to mount the case assembly 20 to the cradle 120. The support arm 130 is used to connect the case assembly 20 to the cradle 120. The support arm 130 includes a longitudinal section 131 and an arcuate section 132 secured to the longitudinal section 131. The longitudinal section 131 protrudes transversally from the longitudinal member 122 of the cradle 120. The arcuate section 132 extends from a first end 132A to a second end 132B. In some embodiments, the arcuate section 132 is secured to the longitudinal section 131 between the first end 132A and the second end 132B. In some embodiments, the arcuate and longitudinal sections may be two parts of a single monolithic body. The first end 132A and the second end 132B of the arcuate section 132 are configured to be fastened to a flange 26 (FIG. 4) located at an intersection between two cases of the case assembly 20. Suitable fasteners, such as threaded bolts, pins, and so on may be used for that purpose. The support arm 130 may be secured in any suitable way to the first section of the case assembly 20.

The engine support 140 may be secured to an end of the longitudinal member 122 of the cradle 120. The engine support 140 includes a flange 141 secured to the longitudinal member 122 via a bracket 142. The flange 141 may have an annular shape and is configured to mate with one of the cases of the case assembly 20 as will be described below.

Figure 4:
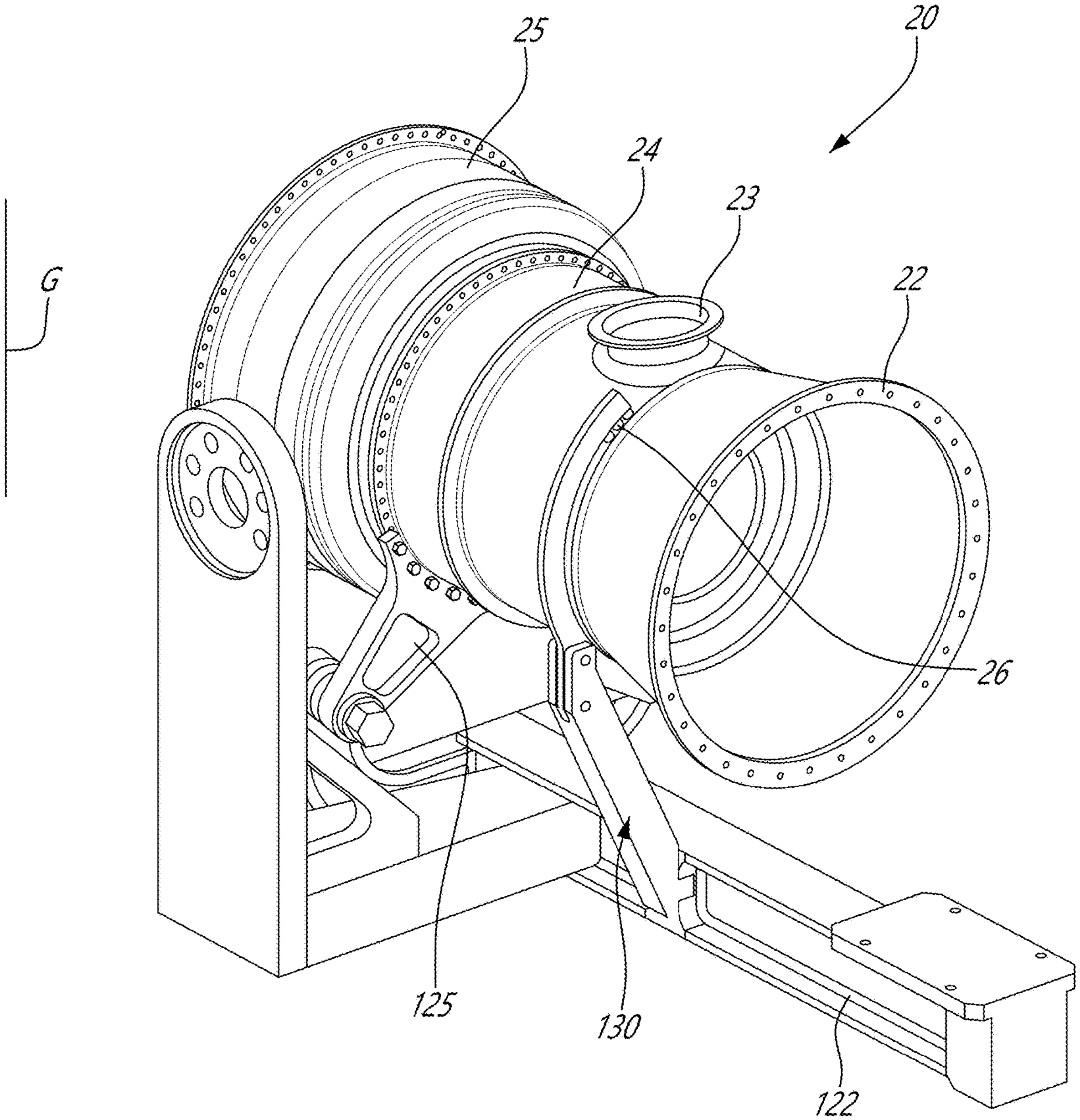
FIG. 4 is a three dimensional view illustrating a first section of a case assembly of the gas turbine engine of FIG. 1 mounted to the cradle of FIG. 3 via a support arm.

Referring now to FIG. 4, the different parts of the stand 100 having been described, a method of assembling the gas turbine engine 10 using the stand 100 is now described. As illustrated the cradle 120, the support arm 130 and the brackets 125 may be used to support a first section of the case assembly 20. In this embodiment, the first section includes the inter compressor case 22, the gas generator case 23, the turbine support case 24, and the exhaust case 25. In some other embodiments, the first section may include one or more of the cases of the case assembly 20.

The support arm 130 is used as a temporary support to minimize a force exerted on the brackets 125. In other words, if the support arm 130 were absent, the first section of the case assembly 20 would be supported at a single axial location relative to the central axis A1 of the gas turbine engine 10. If this location is not centered, a moment will be created on the brackets 125. The case assembly 20 may not be suited to support such loads. Therefore, the support arm 130 is used to provide a support at a second axial location being offset from the first axial location to minimize this moment.

As shown in FIG. 4, in some embodiments, the cradle 120 may be oriented such that the first section of the case assembly mounted thereto is oriented substantially vertically relative to a ground G. In other words, the central axis A1 of the gas turbine engine 10 may be substantially perpendicular to the ground G. In the context of the present disclosure, the expression "substantially" as in "substantially vertically" or "substantially horizontally" implies a variation of plus or minus 10 degrees. By orienting the first section of the case assembly 20 as such, moments exerted on the case assembly 20 may be minimized. At which point, the support arm 130 may be mounted to both of the cradle 120, such as to the longitudinal member 122, and to the first section of the case assembly 20. Then, the case assembly 20 may be rotated since it is now supported at two axially-spaced apart locations.

Figure 5:
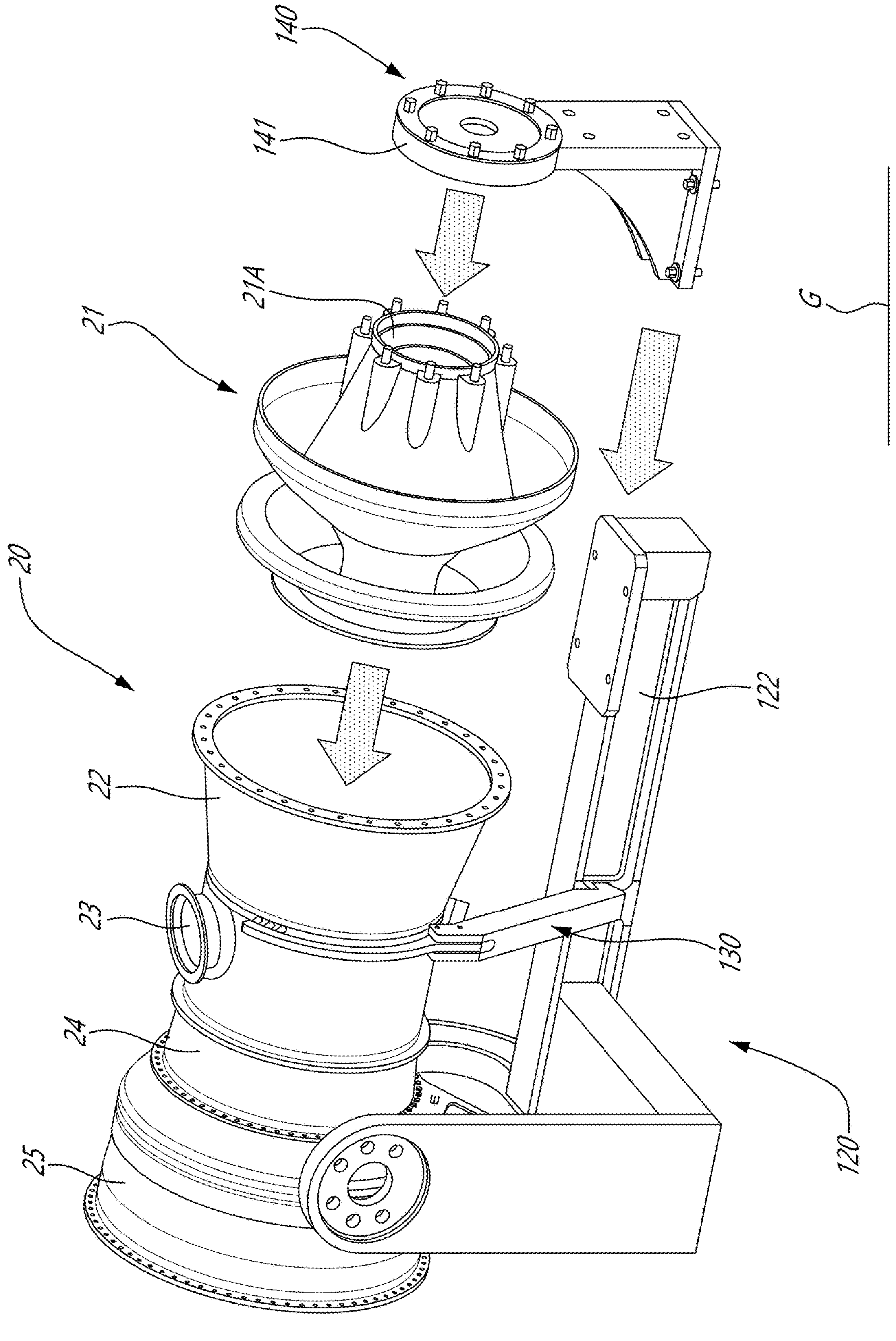
FIG. 5 is a three dimensional exploded view illustrating a second section being secured to the first section of the case assembly.

As shown in FIG. 5, in the substantially horizontal orientation, a second section of the case assembly 20 may be secured to the first section. In this embodiment, the second section includes the inlet case 21, which may be secured, via mating flanges, to the inter compressor case 22. This may be done by axially moving the inlet case 21 towards the inter compressor case 22 and fastening the mating flanges with suitable fasteners.

Then, the engine support 140 may be secured to the cradle 120, herein to an end of the longitudinal member 122, and to the inlet case 21. In this embodiment, the flange 141 of the engine support 140 may be fastened (e.g., bolted) to an axial end face 21A of the inlet case 21.

Figure 6:
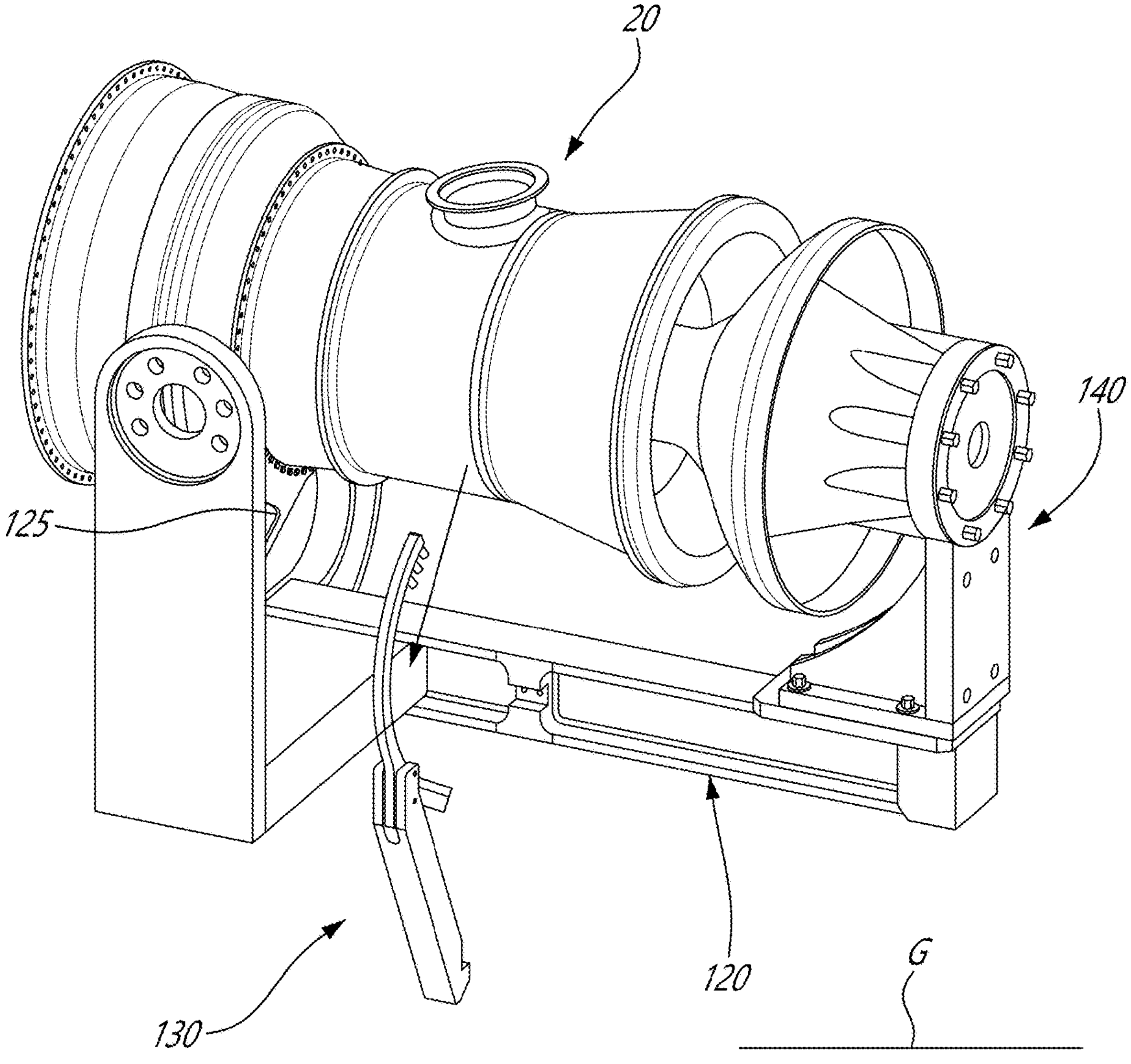
FIG. 6 is a three dimensional exploded view illustrating a removal of the support arm.

As illustrated in FIG. 6, at which point, a load supported by the support arm 130 may be greatly decreased because of the engine support 140. The support arm 130 may thus become unnecessary. The support arm 130 may be removed such that the case assembly 20 is supported to the cradle 120 solely via the one or more brackets 125 and the engine support 140. Removing the support arm 130 as such may facilitate a remainder of the assembling steps of the gas turbine engine 10 since the support arm 130 is no longer limiting access to employees to the gas turbine engine 10. Hence, time savings and costs savings may be generated by removing this temporary support arm. In other words, removing the now unnecessary support arm may clear the access to employees working on assembling the gas turbine engine 10.

Figure 7:
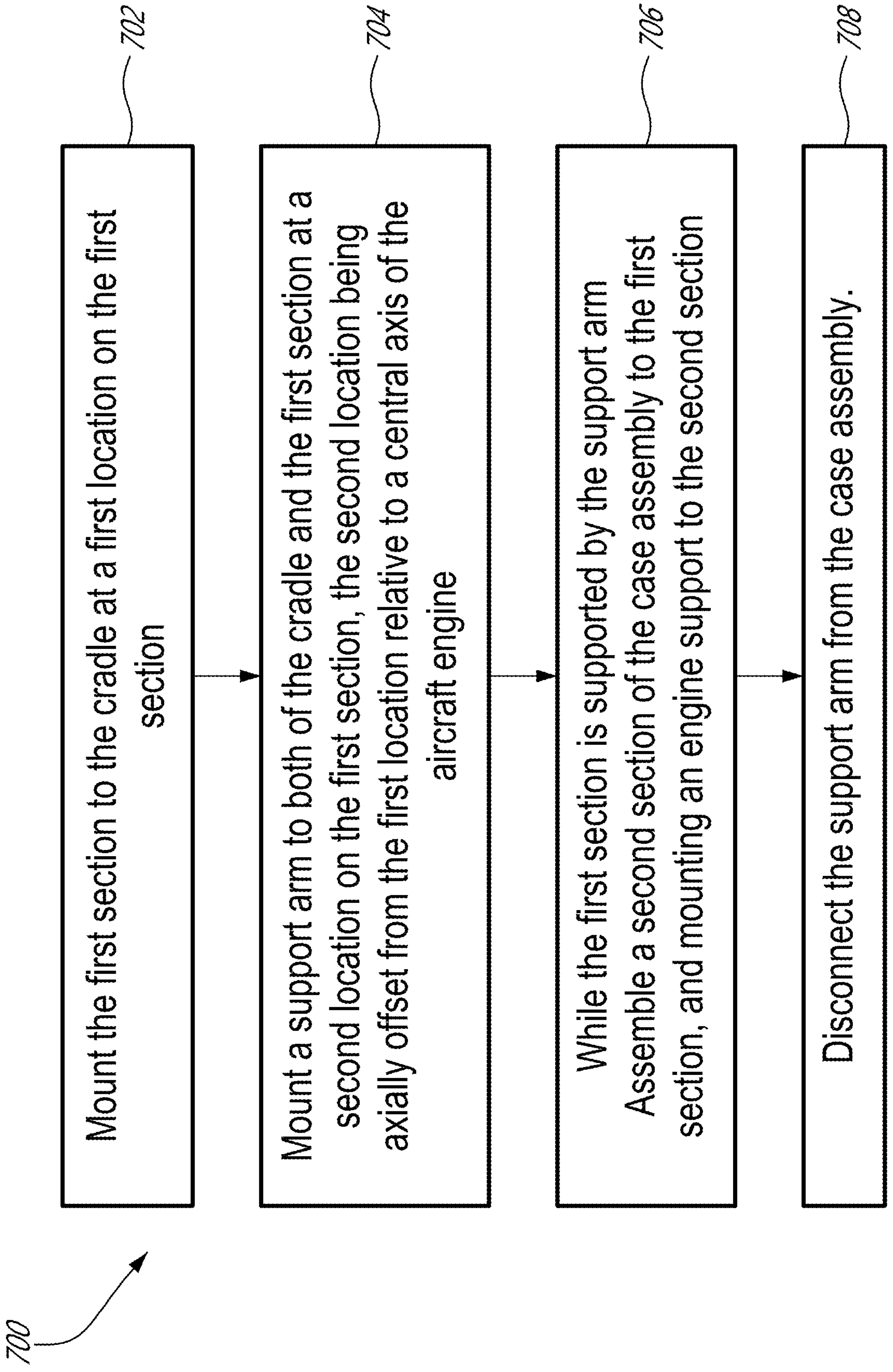
FIG. 7 is a flowchart illustrating steps of a method of assembling a case assembly of the gas turbine engine of FIG. 1.

Referring now to FIG. 7, a method of assembling the gas turbine engine 10, and its case assembly 20, is shown at 700. The method 700 includes mounting the first section of the case assembly 20 to the cradle 120 at a first location on the first section at 702; mounting the support arm 130 to both of the cradle 120 and the first section at a second location on the first section, the second location being axially offset from the first location relative to the central axis A1 of the aircraft engine at 704; while the first section is supported by the support arm 130: assembling the second section of the case assembly 20 to the first section, and mounting the engine support 140 to the second section at 706; and disconnecting the support arm 130 from the case assembly 20 at 708.

In some embodiments, the mounting of the support arm 130 includes mounting the arcuate section 132 to the first section at least at two locations circumferentially spaced apart from one another. The mounting of the arcuate section 132 may include mounting the arcuate section 132 to the flange 26 located at an intersection between two of the cases of the first section.

In some embodiments, the method includes orienting the first section with the central axis A1 being substantially perpendicular to the ground G before the mounting of the support arm 130. Then, the method may include rotating the first section to orient the first section with the central axis A1 being substantially parallel to the ground G before the assembling of the second section to the first section.

In some embodiments, the mounting of the engine support 140 to the second section includes mounting the engine support 140 to an axial extremity of the second section. The mounting of the engine support 140 to the axial extremity of the second section may include abutting the flange 141 of the engine support 140 to the axial end face 21A of the second section.

In some embodiments, the second section may include the inlet case 21. The mounting of the engine support 140 to the second section may include mounting the engine support 140 to the inlet case 21.

In some embodiments, the mounting of the first section to the cradle 120 includes mounting the first section to the cradle 120 via one or more of the brackets 125. These brackets 125 are thus secured to both of the cradle 120 and the first section.

Figure 8:
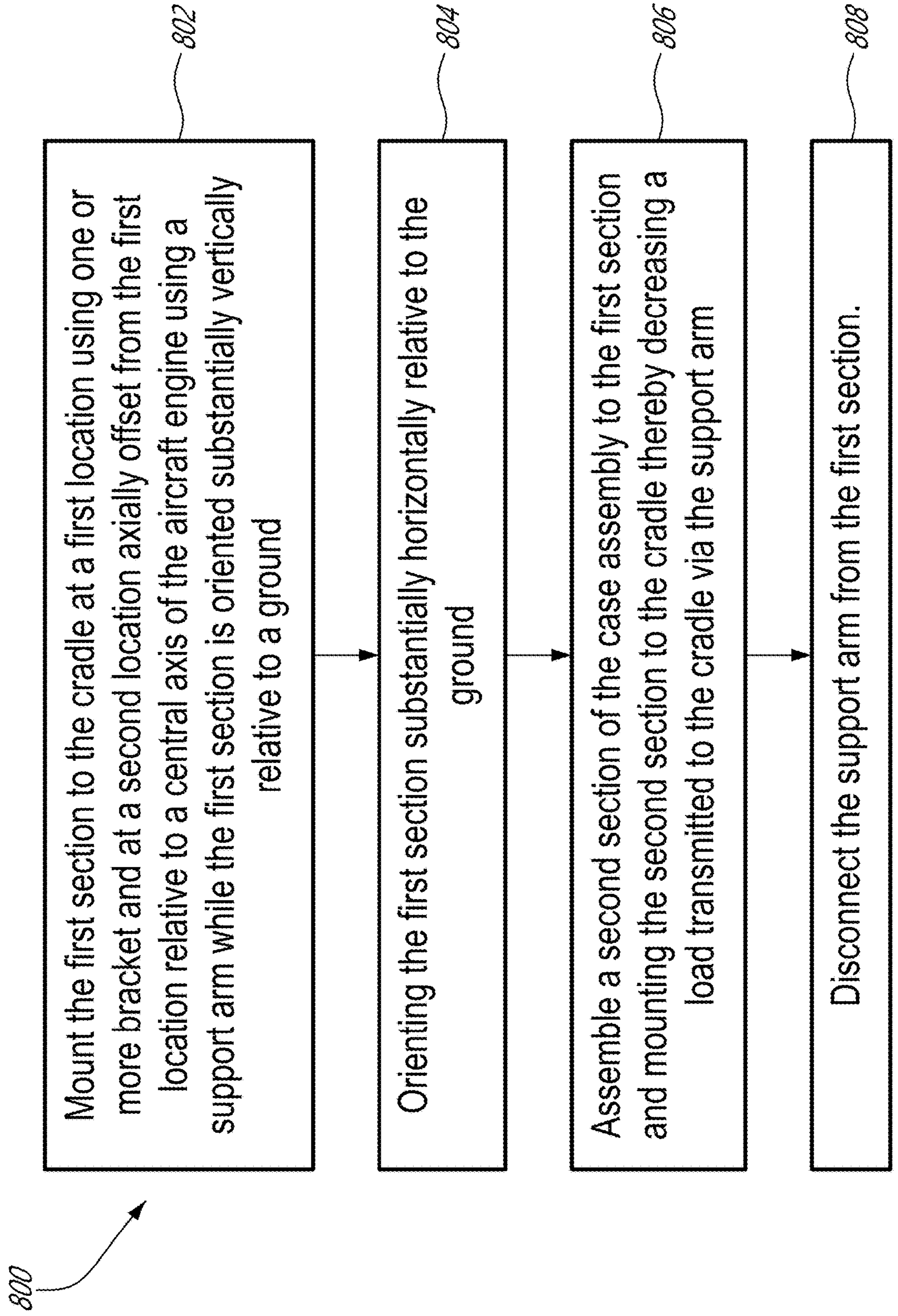
FIG. 8 is a flowchart illustrating steps of a method of temporarily supporting a first section of the case assembly during assembly, disassembly, or maintenance of the gas turbine engine of FIG. 1.

Referring now to FIG. 8, a method of temporarily supporting the first section of the case assembly 20 during assembly, disassembly, or maintenance is shown at 800. The method 800 includes mounting the first section to the cradle 120 at the first location using the one or more bracket 125 and at the second location axially offset from the first location using the support arm 130 while the first section is oriented substantially vertically relative to the ground G at 802; orienting the first section substantially horizontally relative to the ground at 804; assembling the second section of the case assembly 20 to the first section and mounting the second section to the cradle 120 thereby decreasing a load transmitted to the cradle 120 via the support arm 130 at 806; and disconnecting the support arm 130 from the first section at 808.

The steps described above with regards to the method 700 of FIG. 7 may also be applicable to the method 800 of FIG. 8.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of assembling an aircraft engine having a case assembly, the case assembly of the aircraft engine including a first section and a second section securable to one another, each of the first section and the second section including one or more cases of the case assembly, the method comprising:

mounting the first section to a cradle at a first location on the first section, the first section oriented with a central axis of the aircraft engine being substantially perpendicular to a ground;

mounting a support arm to both of the cradle and the first section at a second location on the first section, the second location being axially offset from the first location relative to the central axis;

while the first section is supported by the support arm:

rotating the first section to orient the first section with the central axis being substantially parallel to the ground;

subsequent to the rotating the first section, assembling the second section of the case assembly to the first section with the central axis being substantially parallel to the ground, and mounting an engine support to the second section, the engine support including a body extending between a first end secured to the cradle and a second end secured to the second section; and disconnecting the support arm from the case assembly.

2. The method of claim 1, wherein the second section includes an inlet case of the aircraft engine, the mounting of the engine support to the second section includes mounting the engine support to the inlet case.

3. The method of claim 1, wherein the mounting of the first section to the cradle includes mounting the first section to the cradle via one or more bracket, the one or more bracket secured to both of the cradle and the first section.

4. The method of claim 1, wherein the support arm includes a longitudinal section secured to the cradle and an arcuate section mounted to the longitudinal section, the mounting of the support arm including mounting the arcuate section to the first section at least at two locations circumferentially spaced apart from one another.

5. The method of claim 4, wherein the mounting of the arcuate section includes mounting the arcuate section to an annular flange located at an intersection between two cases of the first section.

6. The method of claim 1, wherein the mounting of the engine support to the second section includes mounting the engine support to an axial extremity of the second section.

7. The method of claim 6, wherein the mounting of the engine support to the axial extremity of the second section includes abutting a flange of the engine support to an axial end face of the second section.

* * * * *